US009959664B2

United States Patent
Moon et al.

(10) Patent No.: US 9,959,664 B2
(45) Date of Patent: May 1, 2018

(54) ADAPTIVE POLYNOMIAL RENDERING

(71) Applicant: Disney Enterprises, Inc., Burbank, CA (US)

(72) Inventors: Bochang Moon, Burbank, CA (US); Markus Gross, Uster (CH); Steven McDonagh, Burbank, CA (US); Kenneth J. Mitchell, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 42 days.

(21) Appl. No.: 15/230,069

(22) Filed: Aug. 5, 2016

(65) Prior Publication Data

US 2018/0040160 A1    Feb. 8, 2018

(51) Int. Cl.
    G06T 15/06    (2011.01)
(52) U.S. Cl.
    CPC .... *G06T 15/06* (2013.01); *G06T 2207/20004* (2013.01); *G06T 2207/20021* (2013.01); *G06T 2207/20024* (2013.01)
(58) Field of Classification Search
    None
    See application file for complete search history.

(56) References Cited

PUBLICATIONS

Bochang Moon, Steven McDonagh, Kenny Mitchel, Markus Gross, "Adaptive Polynomial Rendering", Jul. 2016, ACM, ACM Transactions on Graphics (TOG)—Proceedings of ACM SIGGRAPH 2016, vol. 35 Issue 4, Article No. 40.*

Bochang Moon, Jose A. Iglesias-Guitan, Sung-Eui Yoon, Kenny Mitchell, "Adaptive Rendering with Linear Predictions", Aug. 2015, ACM, ACM Transactions on Graphics (TOG)—Proceedings of ACM SIGGRAPH 2015, vol. 34 Issue 4, Article No. 121.*

Bochang Moon, Nathan Carr, Sung-Eui Yoon, "Adaptive Rendering Based on Weighted Local Regression", Aug. 2014, ACM, ACM Transactions on Graphics (TOG), vol. 33 Issue 5, Article No. 170.*

Tzu-Mao Li, Yu-Ting Wu, Yung-Yu Chuang, "SURE-based Optimization for Adaptive Sampling and Reconstruction", Nov. 2012, ACM, ACM Transactions on Graphics (TOG)—Proceedings of ACM SIGGRAPH Asia 2012, vol. 31 Issue 6, Article No. 194.*

(Continued)

*Primary Examiner* — Robert Bader
(74) *Attorney, Agent, or Firm* — Kilpatrick Townsend & Stockton LLP

(57) ABSTRACT

Embodiments can provide adaptive image filtering. Under this approach, image quality can be enhanced by adjusting an approximation function to better adapt image signals in different parts of an image. Certain parts of the image may be enhanced using a certain approximation function while some other parts of the image may be enhanced using a different approximation function. In certain embodiments, the approximation function selected for a part of the image can be a polynomial function having a specific order. The specific polynomial order can be applied directly to obtain an estimated image value of the part of the image. In certain embodiments, the estimation of the reconstruction error can include iteratively estimating a bias term of the reconstruction error and a variance term of the reconstruction error.

20 Claims, 10 Drawing Sheets

(56) References Cited

PUBLICATIONS

Fabrice Rouselle, Clause Knaus, Matthias Zwicker, "Adaptive Sampling and Reconstruction using Greedy Error Minimization", Dec. 15, 2011, ACM, ACM Transactions on Graphics (TOG)—Proceedings of ACM SIGGRAPH Asia 2011, vol. 30 Issue 6, Article No. 159.*

Fabrice Rouselle, Clause Knaus, Matthias Zwicker, "Adaptive Rendering with Non-Local Means Filtering", Nov. 2012, ACM, ACM Transactions on Graphics (TOG)—Proceedings of ACM SIGGRAPH Asia 2012, vol. 31 Issue 6, Article No. 195.*

Delbracio et al., "Boosting Monte Carlo rendering by ray histogram fusion", ACM Trans. Graph. 33, 1, 8:1-8:15, 2014.

Durand et al., "A frequency analysis of light transport", ACM Trans. Graph. 24, 3, 2005, 1115-1126.

"Frequency Analysis and Sheared Filtering for Shadow Light Fields of Complex Occluders", ACM Trans. Graph. vol. 30, Issue 2 Article 9, Apr. 2011, pp. 9:1-9:13.

Egan et al., "Frequency analysis and sheared reconstruction for rendering motion blur", ACM Trans. Graph. 28, 3, 2009, 93:1-93:13.

Egan et al., "Practical filtering for efficient ray-traced directional occlusion", ACM Trans. Graph. 30, 6, 2011, 180:1-180:10.

Hachisuka et al., "Multidimensional Adaptive Sampling and Reconstruction for Ray Tracing", Proc. ACM SIGGRAPH 2008, vol. 27, Issue 3,Article No. 33, Aug. 2008, pp. 33:1-33:10.

Hayter , "Probability and Statistics for Engineers and Scientists", Brooks/Cole Publishing Co., 2007, 75 pages.

Kajiya, "The Rendering Equation", SIGGRAPH '86: Proc. of the 13th annual conference on Computer graphics and interactive techniques, vol. 20, No. 4, Aug. 1986, pp. 143-150.

Kalantari et al., "A machine learning approach for filtering Monte Carlo noise", ACM Trans. Graph. 34, 4, 2015, 122:1-122:12.

Kalantari et al., "Removing the noise in Monte Carlo rendering with general image denoising algorithms", Computer Graphics Forum 32, 2pt1, 2013, 93-102.

Lehtinen et al., "Reconstructing the indirect light field for global illumination", ACM Trans. Graph. 31, 4, 2012, 51:1-51:10.

Lehtinen et al., "Temporal light field reconstruction for rendering distribution effects", ACM Trans. Graph. 30, 4, 2011, 55:1-55:12.

McCool , "Anisotropic diffusion for Monte Carlo noise reduction", ACM Trans. Graph. 18, 2, 1999, 171-194.

Mehta et al., ". Factored axis-aligned filtering for rendering multiple distribution effects", ACM Trans. Graph. 33, 4, 2014, 57:1-57:12.

Mehta et al., "Axis aligned filtering for interactive sampled soft shadows", ACM Trans. Graph. 31, 6, 2012, 163:1-163:10.

Mehta et al., "Axis-aligned filtering for interactive physically-based diffuse indirect lighting", ACM Trans. Graph. 32, 4, 2013, 96:1-96:12.

Moon et al., "Robust image denoising using a virtual flash image for Monte Carlo ray tracing", Computer Graphics Forum 32, 1, 2013, 139-151.

Overbeck et al., "Adaptive wavelet rendering", ACM Trans. Graph. 28, 5, 2009, 140:1-140:12.

Rousselle et al., "Robust denoising using feature and color information", Computer Graphics Forum 32, 7, 2013, 121-130.

Ruppert et al., "Multivariate locally weighted least squares regression", The annals of statistics 22, 3, 1994, 1346-1370.

Rushmeier et al., "Energy preserving non-linear filters", ACM SIGGRAPH, 1994, 131-138.

Sen et al., "On filtering the noise from the random parameters in Monte Carlo rendering", Acm Trans. Graph. 31, 3, 2012, 18:1-18:15.

Soler et al., "Fourier depth of field", ACM Trans. Graph. 28, 2, 2012, 18:1-18:12.

Yan et al., "Fast 4d sheared filtering for interactive rendering of distribution effects", ACM Trans. Graph. 35, 1, 2015, 7:1-7:13.

Zwicker et al., "Recent advances in adaptive sampling and reconstruction for Monte Carlo rendering", Computer Graphics Forum 34, 2, 2015, 667-681.

* cited by examiner

ADAPTIVE POLYNOMIAL RENDERING

BACKGROUND

Monte Carlo (MC) ray tracing is a rendering algorithm for synthesizing photo-realistic images from 3D models. MC rendering algorithm can typically be used to simulate a variety of rendering effects through a unified framework, i.e., ray tracing. The rendering time of MC ray tracing, however in many cases, is unacceptable since it typically requires integrating a huge number of ray samples, e.g., more than 10K ray samples per pixel, to generate a converged rendered image.

In attempting to tackle the aforementioned ray performance problem of MC ray tracing, various adaptive rendering techniques have been developed. Those techniques typically involve locally controlled sampling rate to adaptively adjust the image reconstruction. For example, some of those techniques involve adaptive sampling the heterogeneous noise property of rendered images to guide irregular sampling density rather than a uniform sampling, and locally controlling smoothing by considering MC noise so that high-frequency edges are properly preserved.

Adaptive image rendering has a long history. For example, Kajiya, J. T, in the paper entitled "the rendering equation" [*ACM SIGGRAPH* '86, 143-150], presented a general idea that high-dimensional MC samples can be allocated adaptively in a hierarchical structure by using the variances of the samples and these samples can be integrated to generate rendered images. Approaches using those techniques typically show high-quality rendering results for a moderate dimension (e.g., 2 to 5), but they typically suffer from the curse-of-dimensionality as the dimension of MC samples can be high (e.g., more than 10) when global illumination is simulated.

Frequency analysis based reconstruction for MC ray tracing has also been actively studied since it can provide high-quality reconstruction results guided by the well-established principle that analyzes light transport in frequency space. Sophisticated anisotropic reconstruction methods using the theory have been proposed for specific rendering effects such as depth-of-field, motion blur, soft shadows, ambient occlusions, distributed effects, and indirect illumination. Recently, the idea of simplifying the frequency based anisotropic filters with a rectangle-shaped filter was presented to design an efficient axis-aligned filter for interactively reconstructing soft shadows, indirect lighting components caused by diffuse (and moderately glossy) bounces, and distribution effects. More recently, an optimization technique has been proposed to achieve an interactive frame rate even while maintaining the shape of sheared filters. Although these methods demonstrated good rendering results even for noisy images, rendered by a small number of samples, they often supported only a subset of rendering effects.

The image-space adaptive methods were developed to addressed the dimensionality issue by analyzing MC errors (e.g., variance) in only 2D image space and denoising the errors through an established image filter, guided by estimated errors. These methods have received attention due to its intrinsic generality and simplicity compared to the high-dimensional adaptive methods. With different image filters, these methods, at a high level, control filtering bandwidths at each pixel to minimize a numerical error. Especially, the recent adaptive methods have proposed optimization algorithms to estimate optimal filtering bandwidths per pixel to minimize the mean squared error (MSE) of reconstruction results. Technically speaking, these attempts can be considered optimization processes that compute an optimal balance between bias and variance, caused by over- and under-blurring, respectively.

The above-described conventional techniques use various reconstruction frameworks. They typically focus on controlling filtering bandwidths locally to increase numerical accuracy. The approximation function used in those techniques is typically fixed (typically as a low-order function).

BRIEF SUMMARY

Embodiments can provide adaptive image filtering. In accordance with the disclosure, a filtering approach different from conventional techniques is provided. Under this approach, image quality can be enhanced by adjusting an approximation function to better adapt image signals in different parts of an image. Certain parts of the image may be enhanced using a certain approximation function while some other parts of the image may be enhanced using a different approximation function. That is, for each of different parts of the image, an optimal approximation function can be selected, and the selected optimal approximation function can be used to filter or reconstruct that part of the image. For example, a high-order (e.g., cubic) function can be selected to accurately reconstruct high curvature regions in the image rather than shrinking filtering bandwidths; and a low order function (e.g., linear) can be selected for smooth areas in the image. The filtered parts of the image can then be combined to obtain an enhanced image.

With this approach, the initial image quality can be improved significantly. For example, this approach can be applied to the MC ray tracing rendering algorithm to reduce the number of ray sampling for the initial image rendering. That is, under this approach, much less ray samples may be needed for obtaining an image quality as good as conventional image rendering approaches using more ray samples. Thus, with this approach, the above-described performance drawbacks associated with MC ray tracing can be improved.

In certain embodiments, the approximation function can be a polynomial function having a specific order. The specific polynomial order can be applied directly to obtain an estimated image value of a particular part of an image, such as a pixel or a block. In those embodiments, for optimizing the estimated image value, an optimal polynomial order can be selected based on a reconstruction error estimated for the polynomial function having the optimal polynomial order. A set of reconstruction errors may be estimated for a plurality of polynomial functions of different orders and a lowest estimated reconstruction error can be selected from the set. The optimal polynomial order can be set to the order of the polynomial function for which the lowest reconstruction error is estimated.

In certain embodiments, the estimation of the reconstruction error can include iteratively estimating a bias term of the reconstruction error and a variance term of the reconstruction error. The iterative estimation of the bias term can involve receiving an initial image value for a part of the image, e.g., a pixel or a block. In the first iteration, the bias term can be estimated from the initial image value, and the image value can then be updated using the estimated bias term. In one or more subsequent iterations, the bias term can be further estimated from the image value updated in the previous iteration, and the image value can be further updated using the bias term estimated in the current iteration. In those embodiments, the variance term can be iteratively estimated similarly to the iterative estimation of the bias term.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

TERMS

Figure 1:
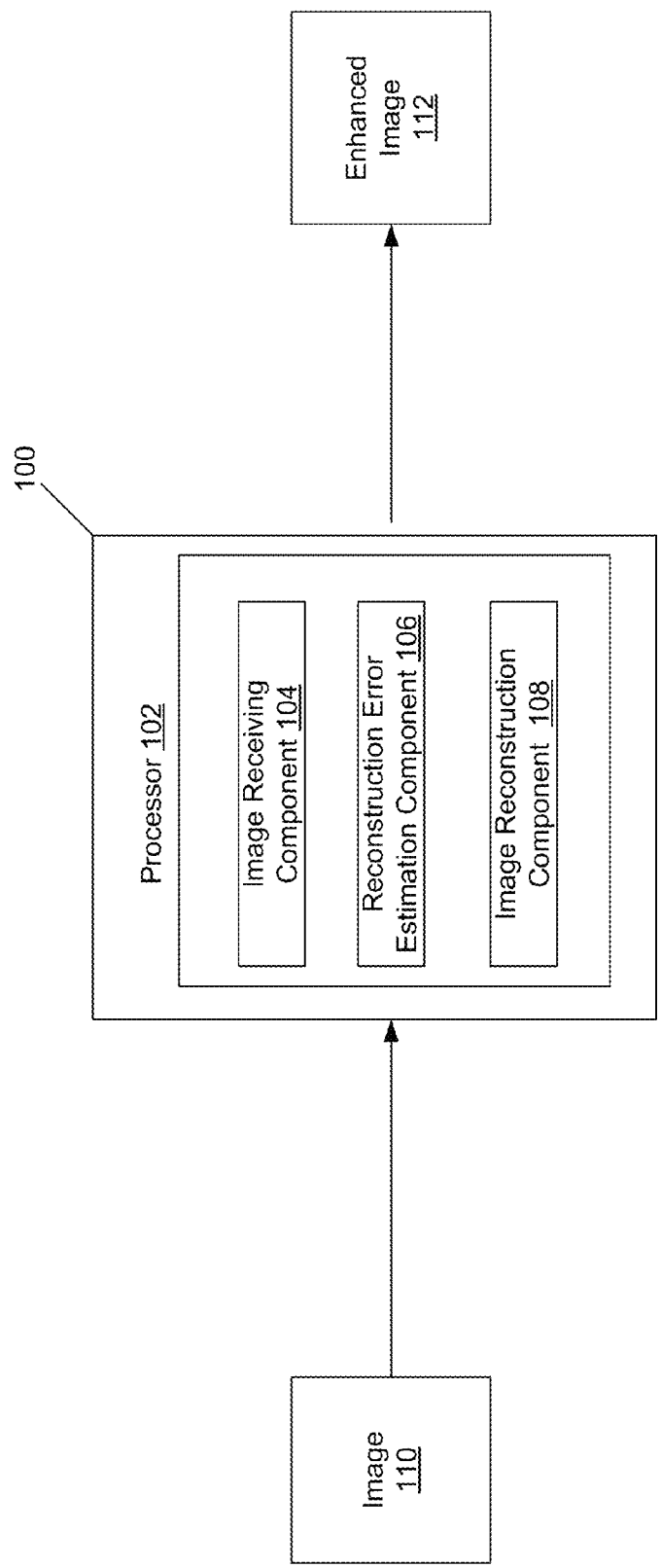
FIG. 1 illustrates generally a computer system that can be used to adaptively filter an image in accordance with the disclosure.

As used herein, a part of an image may be referred to as a pixel or a block of pixels of the image. For example, an image of 10000 pixels may be broken into 100×100 blocks, with each block having 100 pixels, such that there are 100 blocks on each pixel row and 100 blocks on each pixel column in the image. An image value for a part of the image as used herein can thus be referred to as an image value (e.g., color and opacity) for a pixel or a block of the image. For example, a block of pixels in the image can have an overall image value representing a color and opacity of the image block as a whole.

As used herein, filtering or reconstructing an image may be referred to as filtering or reconstructing a specific part of the image using an approximation function selected for that part of the image. The filtered or reconstructed image typically has an improved image quality compared to the original image.

As used herein, reconstructing a part of an image may be used interchangeably with filtering an part of an image. Either involves using an approximation function, such as a polynomial function, to enhance one or more image values of the part of the image.

As used herein, an optimal polynomial for reconstructing a part of an image may be referred to as an order of a polynomial function selected for enhancing that part of the image. For example, a polynomial function of a cubic order may be selected for enhancing one part of the image, and thus three is the optimal polynomial order for reconstructing that part of the image. As another example, a polynomial function of a linear order may be selected for enhancing another part of the image, and thus one is the optimal polynomial order for reconstructing that part of the image.

As used herein, a reconstruction error may be referred as to an error incurred by a selected approximation function when filtering an image using the selected approximation function. As such, the reconstruction error can represent a difference between an estimated image value and a ground truth intensity of a part of the image. As used herein, a ground truth intensity may be referred to as a perfect image value that can only computed with an infinite number of ray samples in a MC algorithm.

DETAILED DESCRIPTION

Embodiments are directed to adaptive image rendering. In various embodiments, each different part of an image can be enhanced using an optimal approximation function selected for that part of the image. The optimal approximation function can be selected from a plurality of functions. The selection may involve comparing reconstruction errors associated with individual ones of the plurality of functions. The reconstruction errors can be compared to identify a lowest reconstruction error associated with a corresponding approximation function. The corresponding approximation function can then be selected as the optimal approximation function for the part of the image. For each part of the image, an optimal approximation function can be so selected and used to filter the part of the image. The filtered parts of the image can be combined to obtain an enhanced image.

In certain embodiments, the approximation function used in the adaptive image rendering in accordance with the disclosure is a polynomial function having a specific polynomial order, e.g., linear, square, cubic, quadric, and so on. In those embodiments, an image value of a part of an initial image can be reconstructed using the polynomial order of the polynomial function selected for enhancing that part of the image—i.e., an optimal polynomial order. The optimal polynomial order can be selected by obtaining a lowest reconstruction error. In implementations, for obtaining the lowest reconstruction errors, a set of reconstruction errors can be estimated from a plurality of candidate polynomial orders. The lowest reconstruction error can then be selected from the set of reconstruction errors. In those embodiments, the estimation of the reconstruction error can include iteratively estimating a bias term of the reconstruction error and a variance term of the reconstruction error.

In certain embodiments, the iterative estimation of the bias term can involve multiple iterations of estimating the bias term. In those embodiments, in the first iteration, an initial image value can be used to estimate the bias term with a specific polynomial order, and the image value can be updated using the bias term estimated in the first iteration. In one or more iterations subsequent to the initial iteration, the bias term can be further estimated with the specific polynomial order using the image value estimated in the previous iteration, and image value can be updated using the bias term estimated in the current iteration.

I. Introduction

For a part of an image, i.e., a pixel or a block, an image value may be first obtained from an image rendering algorithm, such as the MC ray tracing algorithm described above. Briefly, under the MC algorithm, ray tracing can be performed by shooting a sample number of rays into a 3D virtue scene through each pixel in the image. Each pixel value can then be estimated based on the values of the ray samples. However, the pixel value can be noisy depending on the number of ray sample used. For enhancing the pixel value, one or more filtering algorithms can then be used to filter the noises. Such a filtering algorithm typically involves an approximation function, such as a polynomial function. During filtering process, the approximation function can be typically applied to the initial pixel value to obtain an enhanced pixel value.

Figure 3A:
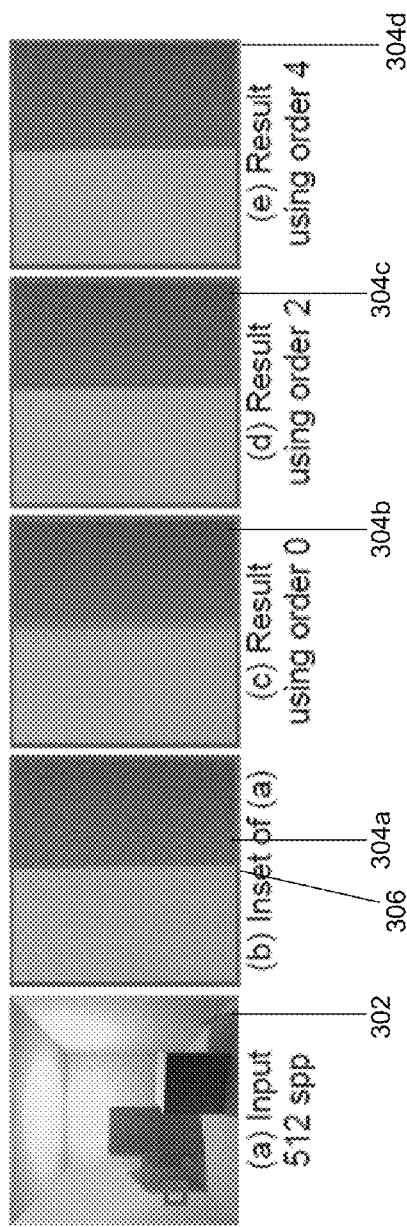
FIGS. 3A-B illustrate results of using function of different polynomial orders to reconstruct an image having a non-linear edge in accordance with the disclosure.
Figure 3B:
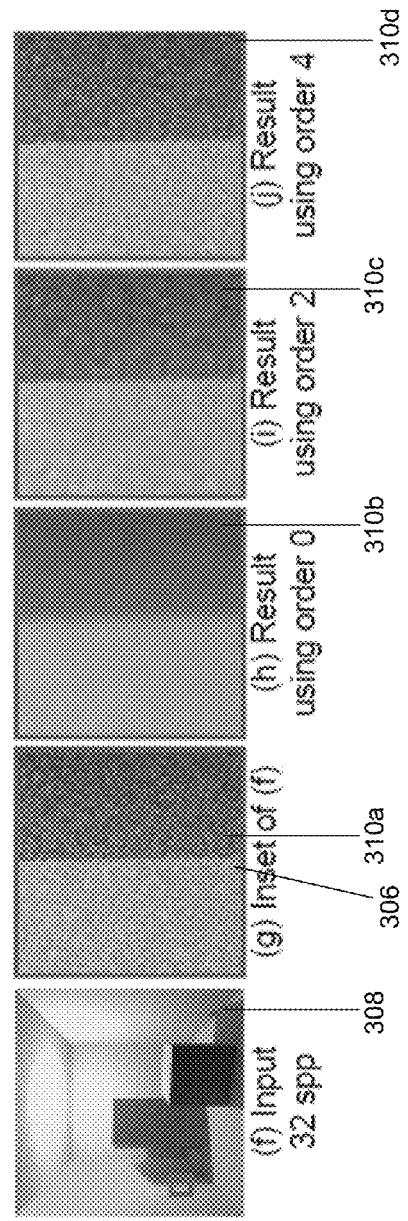

However, as mentioned above, traditional filtering approaches typically use a fixed low ordered polynomial function, for example a constant or linear polynomial function, for enhancing every pixel in the image. In accordance with the disclosure, a filtering approach different from the traditional approaches is provided. Under this approach, different approximation functions can be employed in filtering different parts of the image. A key motivation for this approach is that different parts of the image can have different image characteristics. For example, certain parts of the image may have a continuous edge, while some other parts of the image may be relatively smooth (i.e. no edges) but with a lot of noises. As shown in FIGS. 3A-B, certain approximation function, such as a high ordered polynomial function (e.g., an order of four), may be better suited to enhance the parts of the image that have strong edges than certain other approximation function, such as a lower ordered polynomial function (e.g., an order of one). On the other hand, the lower ordered polynomial function may be better suited to enhance parts of the image that are smooth but with a lot of noise than the higher ordered polynomial. Accordingly, an adaptive filtering approach can be used such that different parts of the image can be filtered independently based on the image characteristics in a specific part of the image.

A. General System Architecture

FIG. 1 illustrates generally a computer system 100 for adaptively filtering an image in accordance with the disclosure. As shown, the system 100 can include one or more of a processor 102 configured to implement computer program components, which can include an image receiving component 104, a reconstruction error estimation component 106, an image reconstruction component 108, and/or any other components.

The image receiving component 104 can be configured to receive an image 110. As described above, in some examples, the image 110 can be an image of a 3D scene rendered using an MC algorithm. However, it should be understood this is not necessarily the only case. In some other examples, image 110 can be any digital image, regardless how it was first rendered. For example, the image 110 may simply be an image of a real-world scene captured by a digital camera, or may be an image produced by a scanner. In any case, image receiving component 104 can be configured to receive the image 110. In certain embodiments, receiving the image 110 by image receiving component 104 may include reading image values of the image. For example, the image receiving component 104 can be configured to read a pixel value (e.g., color, brightness, and/or opacity) for each pixel in image 110. In certain embodiments, the image receiving component 104 may be configured to break image 110 into blocks of pixels, for example 100×100 blocks, with each block having 100 pixels. In those embodiments, the image receiving component 104 may be configured to compute an image value (e.g., color, brightness, and/or opacity) for each block of the image.

The reconstruction error estimation component 106 can be configured to estimate a reconstruction error for reconstructing a part of the image 110 using a specific approximation function. For example, Lehtinen et al. 2011 and Lehtinen et al. 2012 have described various different filters for filtering images with different image characteristics. Lehtinen et al. 2011 and Lehtinen et al. 2012 are incorporated by reference herein in their entirety. In certain implementations, estimating the reconstruction error by the reconstruction error estimation component 106 can include obtaining one or more image values for image 110 received by image receiving component 104. For example, the reconstruction error estimation component 106 can be configured to read image values for a specific pixel or block. The estimation of the reconstruction error by the reconstruction error estimation component 106 can be based on the obtained image values and a selected approximation function. In one implementation, the reconstruction error estimation by the reconstruction error estimation component 106 is based on the obtained image values and a polynomial order of the selected approximation function. As will be described in details below, the reconstruction error estimation by the reconstruction error estimation component 106 can involve multiple iterations of reconstruction estimation.

The image reconstruction component 108 can be configured to reconstruct a part of the image based on the reconstruction errors estimated for a plurality of functions by the reconstruction error estimation component 106. The image reconstruction by the image reconstruction component 108 can include obtaining, from the reconstruction error estimation component 106, the reconstruction errors for each of the plurality of functions, comparing the reconstruction errors, selecting the function with the lowest reconstruction error as the approximation function for that part of the image, and/or any other operations. In some implementations, the image reconstruction component 108 can be configured to identify a polynomial order for the function with the lowest reconstruction error and set the polynomial order as the optimal polynomial order. In those implementations, the image reconstruction component 108 can be configured to reconstruct the part of the image based on the optimal polynomial order. The image reconstruction component 108 can also be configured to combine the reconstructed parts of the image to obtain enhanced image 112.

B. A Process of Adaptively Image Filtering

Figure 2:
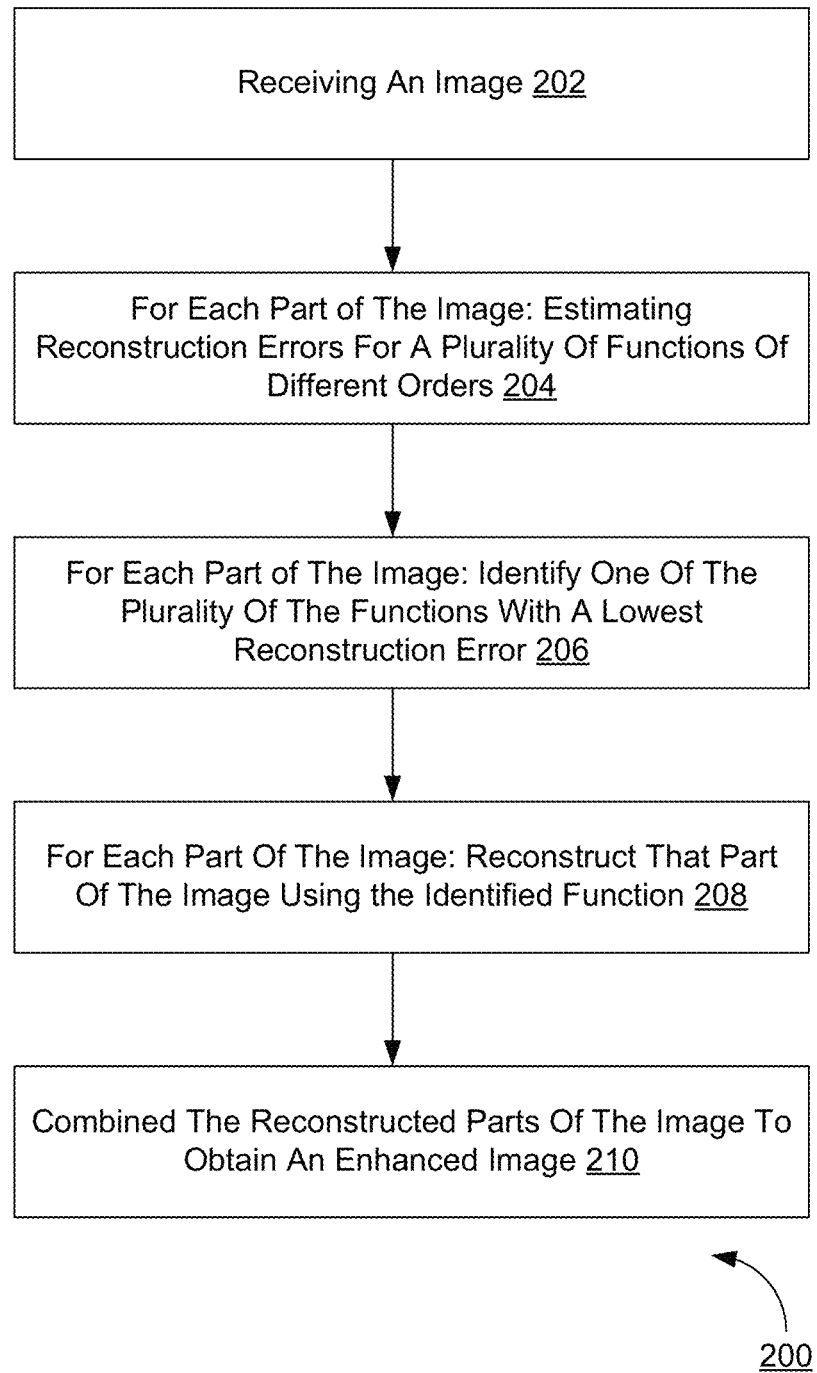
FIG. 2 is a flowchart of a method for adaptively filtering an image in accordance with the disclosure.

FIG. 2 is a flowchart of a method 200 for adaptively filtering an image in accordance with the disclosure. The method presented in FIG. 2 and described below is intended to be illustrative and non-limiting. The particular series of processing steps depicted in FIG. 2 is not intended to be limiting. It is appreciated that the processing steps may be performed in an order different from that depicted in FIG. 2 and that not all the steps depicted in FIG. 2 need be performed. In certain implementations, the method 200 may be implemented by a computer system, such as the computer system 100 shown in FIG. 1.

In some embodiments, the method depicted in method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At 202, an input image can be received. As described above, the image received at 202 can be rendered by a rendering process that employs MC ray tracing. In some embodiments, operations at 202 may include breaking the received image into different blocks, e.g., 100×100 blocks of pixels, each block having 100 pixels. In those implementations, operations at 202 may further include obtaining an image value (e.g., color, brightness, and/or opacity) for each part (e.g., block or pixel) of the image received at 202. In some exemplary implementations, 202 may be implemented by an image receiving component the same as or substantially to the image receiving component 104 as described and illustrated herein.

At 204, for each part of the image received at 202, reconstruction errors can be estimated based on image received at 202. As mentioned above, different parts of the image received at 202 can have different image characteristics. Thus, operations at 204 may involve, for each part of the image received at 202, estimating a set of reconstruction errors for a plurality of functions with different orders. In implementations, for each of the plurality of functions, the reconstruction error can be estimated based on the image signals in that part of the image. In some exemplary implementations, 204 may be implemented by a reconstruction error estimation component the same as or substantially to reconstruction error estimation component 106 as described and illustrated herein.

At 206, for each part of the image received at 202, a lowest reconstruction can be identified from the set of reconstructions errors estimated for that part of the image at 204; and the approximation function with the lowest reconstruction error can thus be identified. Operations at 206 can involve comparing the set of reconstruction errors estimated 204 to identify the lowest reconstruction error. In some exemplary implementations, 206 may be implemented by a reconstruction error estimation component the same as or substantially to reconstruction error estimation component 106 as described and illustrated herein.

At 208, for each part of the image received at 202, that part of the image can be reconstructed using the function identified at 206. In some embodiments, the operations at 208 may involve applying the function identified at 206 to the image value(s) of the part of the image received at 202, and obtaining an enhanced image value or enhanced image values for the part of image. In some implementations, 208 may be implemented by image reconstruction component the same as or substantially to image reconstruction component 108 as described and illustrated herein.

At 210, the reconstructed parts of the image can be combined to obtain an enhanced image. Operations at 210 may employ one or more image rendering techniques, such as stitching. In some implementations, 210 may be implemented by image reconstruction component the same as or substantially to image reconstruction component 108 as described and illustrated herein.

With the adaptive image filtering in accordance with the disclosure having been generally described, attention is now directed to section II, where details regarding certain embodiments are provided and rationales behind the adaptive image filtering in accordance with the disclosure will become apparent.

II. Reconstructing an Image

Image reconstruction techniques can be generally divided into different categories of approaches, such as the Multi-dimensional Adaptive approaches, Frequency Analysis based approaches, image-space adaptive approaches, and any other approaches. In Moon et al. 2015, some of these approaches have been described and Moon et al. 2015 is incorporated by reference herein in its entirety. For example, various techniques have been developed using the image-space adaptive approach to control filtering bandwidths locally for increasing numerical accuracy of image signals. As described above, the adaptive filtering approach provided by this disclosure is different from the conventional approaches in that the numerical accuracy of the image signals are enhanced by adaptively adjusting the approximation function to better adapt image signals in a data-driven way. In some embodiments, the adjusting of the approximation function in accordance with the disclosure may include adjusting a polynomial order of the approximation function. In subsection A, an image reconstruction framework and principles of the adaptive filtering approach in accordance with the disclosure are provided.

A. An Image Reconstruction Framework

Given an input image function at a pixel i, the following statistical model can represent a relationship between an input image, such as image 110 shown in FIG. 1 and an ideal image:

$$y(i)=\mu(i)+\varepsilon(i), \tag{1}$$

In equation 1, y(i) may represent an image value of the input image at position i. $\mu(i)$ may represent a ground truth intensity at position i, for example, that can only be computed with an infinite number of samples with a MC algorithm. The $\varepsilon(i)$ may model a noise or noises at position i, i.e., variance, which may have a zero mean, i.e., $E(\varepsilon(i))=0$, where E is the expectation operator. The ultimate goal of any reconstruction method is thus to estimate the unknown $\mu(i)$ from the observed noisy inputs of y(i) as an enhanced y(i) that can be combined to obtain an enhanced image, such as the enhanced image 112 shown in FIG. 1. In some embodiments, y(i) can be a 1D function and the reconstruction can be applied to each color channel independently.

From the above statistical model, the unknown image function $\mu(i)$ can be decomposed into two functions g(f) and p(i) such that $\mu(1) \equiv g(f_i)+p(i)$. In certain embodiments, $g(f_i)$ may be a linear function that takes a feature vector $f_i \in R^8$, e.g., normals (3D), textures (3D), depths (1D), and visibility (1D) as inputs, which can easily be computed at the intersection points between rays and scenes during the MC rendering process or other like rendering processes. On the other hand, the second function p(i) can be defined as a 2D function that takes position i as input. In this way, the unknown $\mu(i)$ can be estimated with the feature function $g(f_i)$ using correlation between rendering-specific features $f_i$ and the unknown image function $\mu(i)$. When the features are not helpful, e.g., glossy reflections, the residuals $\mu(i)-g(f_i)$ can be approximated using the 2D polynomial function p(i) since the residuals are intrinsically 2D image functions.

In certain embodiments, a polynomial function, such as a Taylor polynomial function, can be used to locally approximate the unknown image function $\mu(i)$ using equation 2 below:

$$\mu(i) \approx \nabla g(f_c)(f_i - f_c)^T + p(c) + \sum_{1 \le a \le k} \frac{\nabla^a p(c)}{a!}((i-c)^a)^T, \quad (2)$$

In equation 2, $\nabla$ and k are the differentiation operator and the Taylor polynomial order, respectively. The use of Taylor polynomials for estimating an image value can be found in Wand 1994, which is incorporated by reference herein in its entirety.

Thus, according to equation 2, given a specific polynomial order k, the coefficients of two functions can be optimally estimated within a filtering window $\Omega_c$ in the least-square sense as follows:

$$\sum_{i \in \Omega_c} \left( y(i) - \alpha(f_i - f_c)^T - \beta_0 - \sum_{1 \le a \le k} \beta_a((i-c)^a)^T \right)^2 K_h(i). \quad (3)$$

Through equation 3, estimated coefficients $\hat{\alpha}$ and $\hat{\beta}$ can be provided for the two functions $g(f_i)$ and $p(i)$ given a specific order k, respectively. The kernel function $K_h(i)$ is a weighting function (e.g., Gaussian) that assigns a weight on pixel i, and the parameter h, used by the function, is known as the filtering bandwidth that controls the bias-variance tradeoff of this reconstruction process. Equation 3 is a least-squares formula and has a closed-from solution, normal equation, $(\hat{\alpha}, \hat{\beta}) = (X_k^T W X_k) X_k^T W y$, where X is a design matrix and each row of the design matrix X is set as $[1, f_i, (i-c)^1, \ldots, (i-c)]^T$ and W is a diagonal matrix that has $K_h(i)$ as its elements. The vector y has MC input intensities y(i) as its elements.

Given the normal equation, Moon et al. 2014, which is incorporated by reference herein in its entirety, provides that reconstructed values within the filtering window $\Omega_c$ can be computed in a pixel-wise manner as follows:

$$\hat{y}_k(c) = e_i(X_k^T W X_k) X_k^T W y, \quad (4)$$

In equation 4, $e_1$ is a vector that has one as its first element, i.e., $e_1 = [1, 0, \ldots 0]^T$, and window $\Omega_c$ is a filtering window in the image centered on a Pixel c. The size of the filtering window $\Omega_c$ can be set as desired. Typically, a window size of 20×20 can be used for $\Omega_c$.

B. Block Based Image Reconstruction

Alternative to the pixel-wise reconstruction function presented in equation 4, the reconstruction for each construction within the filtering window $\Omega_c$ can be computed simultaneously. Moon et al 2015, which is incorporated by reference herein in its entirety, describes the simultaneous reconstruction can use the following equation:

$$\hat{y}_k = X_k(X_k^T W X_k) X_k^T W y = H(k)y, \quad (5)$$

In equation 5, the matrix $H(k) = X_k(X_k^T W X_k) X_k^T W$ may be referred to as a hat matrix that defines a projection from the input values y to projected values $\hat{y}$. After computing the reconstructed values at each center pixel in the block, the output vector $\hat{y}$ from each polynomial model at center pixel c can be combined for the block since the reconstructed pixels in two regions, e.g., $\Omega_{c1}$ and $\Omega_{c2}$ from two center pixels c1 and c2, may overlap. In some embodiments, a weighted average using $K_h(i)$ can be utilized to compute a final reconstruction output $\hat{y}(i)$ at each pixel i as follows:

$$\hat{y}(i) = \sum_{j \in \Omega_i} K_h^j(i) \hat{y}_k^j(i) \Big/ \sum_{j \in \Omega_i} K_h^j(i), \quad (6)$$

In equation 6, $K_h^j(i)$ and $\hat{y}_k^j(i)$ are the weight and reconstruction result for pixel i computed from center pixel j. This block-based reconstruction presented in equation 6, compared to the pixel-wise reconstruction presented in equation 4, can adapt well to large regions, i.e., $\Omega_c$, by increasing the polynomial order k. This forms one of the crucial advantages of using higher-order polynomials for this task. It also leads to a robust error analysis that estimates reconstruction errors in a region (Sec. 4).

C. Polynomial Function

Various conventional filtering methods may be explained with equation 3 above. For example, when $g(f_i)$ and $p(i)$ are set as a null and zero-order function, the reconstruction is converted to a simpler form such as Gaussian (e.g., Rousselle et~al. 2011), cross-bilateral (e.g., Rousselle et~al. 2012, and non-local means filter (e.g., Rousselle et~al. 2012) depending on the kernel function $K_h$ (i). Also, if $g(f_i)$ and set $p(i)$ are as a linear function, the formulation is equivalent to the weighted local regression framework (e.g., Moon et~al. 2014). However, as mentioned, these conventional methods use fixed functions $g(f_i)$ and $p(i)$ with a typically low-order (e.g., zero or linear), and then optimize the kernel function $K_h(i)$ in terms of the filtering bandwidth h.

Different from the conventional methods described above, the adaptive filtering method in accordance with the disclosure can select an optimal function p(i) to reconstruct a specific part of the image instead of optimizing the kernel function $K_h$ (i). In certain embodiments, for optimization, the polynomial order the p(i) is controlled to adjust the bias-variance tradeoff. In certain embodiments, for focusing on the p(i) optimization, the kernel function can be set as a simple Gaussian function as $K_h(i) = e^{-\|i-c\|^2/(2 \times h^2)}$ and h as a large constant, e.g., half-width of the local window size $\Omega_c$.

1. Impact of an Order of the Polynomial Function

One motivation behind the adaptive filtering method in accordance with the disclosure is that high-order polynomials (e.g., quadratic, cubic, and higher order) can provide improved approximations of non-linear functions (e.g., discontinuous signals). This can be considered counter-intuitive since smooth functions (e.g., Taylor polynomials) are used in the filtering method in accordance with the disclosure. One may think that increasing the polynomial order can decrease the approximation quality, i.e., Runge's phenomenon, but note that the unknown function $\mu(i)$ is defined on a discretized space i, i.e., pixel position, instead of a continuous space. As the polynomial order is increased, the filtering method in accordance with the disclosure converges to an interpolation method that passes the input value y(i) (i.e., zero bias), since the degree of freedom, i.e., number of unknown parameters of our optimization, also goes to the number of pixels within the filtering window.

FIGS. 3A-B illustrate results of using function of different polynomial orders to reconstruct an image having a non-linear edge in accordance with the disclosure. In FIG. 3A a 3D scene 302 is rendered using 512 sample rays. 304a is an initial image rendered. As can be seen, there is an edge 306 in image 304a. Different polynomial orders are subsequently used to enhance the image 304a based equation 4 or equation 6. The enhanced images are 304b, acquired using a polynomial order of 0; image 304c, acquired using a polynomial order of 2; and image 304d, acquired using a polynomial order of 4. As can be seen, the higher order polynomials, e.g., fourth order as illustrated in FIG. 3A, preserves the discontinuous edge 306 better than low order polynomials, when the discontinuous edge 306 in the initial image is strong.

In FIG. 3B, a 3D scene 308 is rendered using 32 sample rays, much lower than FIG. 3A. Similarly, the initial image rendered is 310a, and the enhanced images are 310b, acquired using a polynomial order of 0; image 310c, acquired using a polynomial order of 2; and image 310d, acquired using a polynomial order of 4. As can be seen, the higher order polynomials, e.g., fourth order as illustrated in FIG. 3A, produces noisy image, when the initial image is relatively noisy and the discontinuous edge 306 is relatively not strong.

2. Using a Specific Order of the Polynomial Function for the Image Reconstruction Thus, the impact of a polynomial order in a filtering method based on equation 2 is that a high order (e.g., fourth) preserves the non-linear edge well even, but high-order polynomial functions tend to produce noisier reconstruction results than low-order as they typically increase the variance of reconstruction (see [Ruppert and Wand 1994], which is incorporated by reference herein in its entirety, for a formal derivation of the errors). These properties motivate the design of adaptive polynomial selection employed in a filtering method in accordance with the disclosure. That is, the bias-variance tradeoff can be controlled by adjusting the polynomial order instead of the conventional approach of tweaking the filtering bandwidth term h in $K_h(i)$.

In section III, an adaptive reconstruction approach is described. The adaptive reconstruction approach described in section III takes into consideration that image characteristics are different for different parts of the image (e.g. blocks), and different polynomial functions of different orders may be selected for reconstructing different parts of the image.

III. Adaptive Polynomial Reconstruction

Under an adaptive polynomial reconstruction approach in accordance with the disclosure, reconstruction of the image can be performed on individual blocks of the image independently using an optimal polynomial order selected for each of the blocks. In some exemplary implementations, the reconstruction can be applied to center pixels of individual blocks of the image and a regular sampling process can be applied to select the center pixels. In one implementation, center pixels with x and y positions that are multiples of the half size of our filtering window (e.g., 14 for a 29×29 filtering window) are chosen. This can reduce computational burden since the reconstruction may be performed at only a small number of center pixels.

A. Optimal Polynomial Order Selection Based on a Lowest Reconstruction Error

As mentioned above, for any reconstruction, a reconstruction error $\varepsilon(i)$ can be defined as the difference between $y(i)$ and $\mu(i)$, where i is a particular pixel (e.g., a center pixel), $y(i)$ is the input pixel value at i and $\mu(i)$ is the truth intensity value at i that is desired to be achieved. Thus, for acquiring an optimal $\mu(i)$, the goal is to minimize $\varepsilon(i)$. In certain embodiments, for reconstructing a particular block of the image, an adaptive polynomial reconstruction approach in accordance with the disclosure may include estimating reconstruction errors for a plurality of polynomial functions of different orders, selecting a polynomial order with which the lowest reconstruction error was produced, and setting the selected polynomial order as an optimal polynomial order for reconstructing the block.

Figure 4:
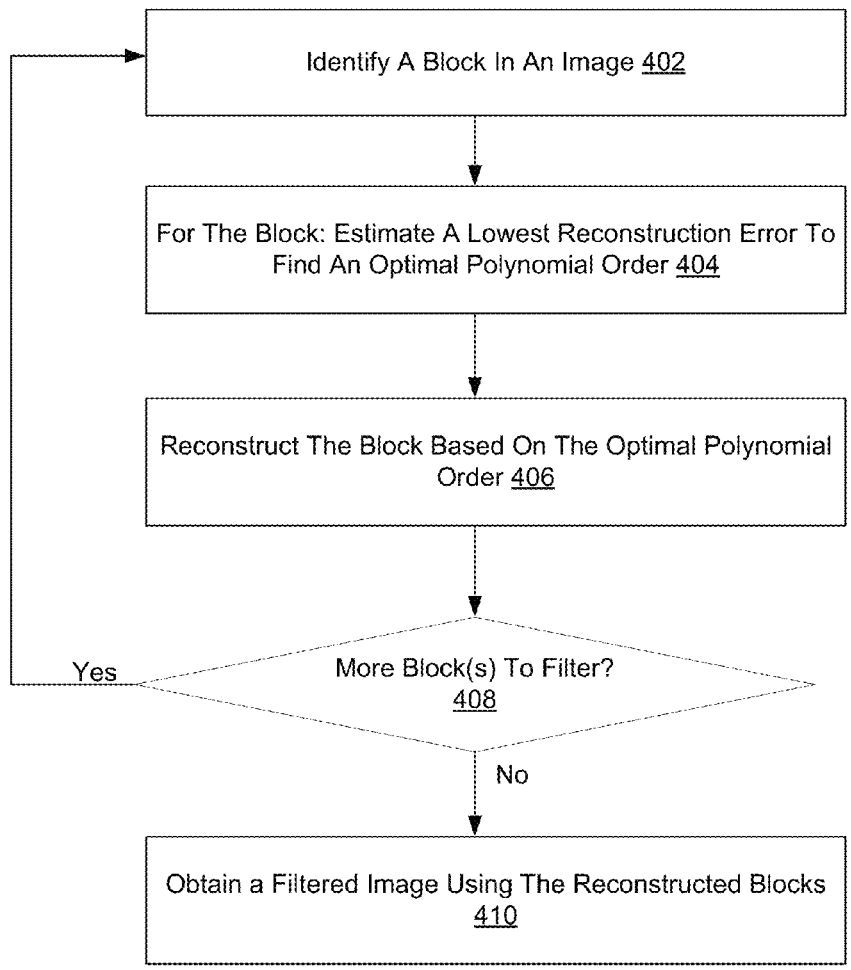
FIG. 4 is a flowchart of a method for adaptively filtering an image at a block level in accordance with the disclosure.

FIG. 4 is a flowchart of a method 400 for adaptively filtering an image at a block level in accordance with the disclosure. The method presented in FIG. 4 and described below is intended to be illustrative and non-limiting. The particular series of processing steps depicted in FIG. 4 is not intended to be limiting. It is appreciated that the processing steps may be performed in an order different from that depicted in FIG. 4 and that not all the steps depicted in FIG. 4 need be performed. In certain implementations, the method 400 may be implemented by a computer system, such as the computer system 100 shown in FIG. 1.

In some embodiments, the method depicted in method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At 402, a block of an image may be identified. As mentioned above, the adaptive image filtering in accordance with the disclosure may be performed on blocks of an image independently. Operations 402 may involve identifying a block of an image that has not been filtered using the adaptive image filtering in accordance with the disclosure. For example, the adaptive image filtering may move from one block to another in a sanning order. However, this not necessarily the only case. In some exemplary implementations, the adaptive image filtering may process multiple blocks of images at the same time in parallel. In one implementation, all of the blocks in the image may be processed in parakeet starting at 402.

At 404, for the block identified at 402, a lowest reconstruction error may be estimated to find an optimal polynomial order for the block. Operations at 402 can involve estimating a set of reconstruction errors for a plurality of polynomial functions, and identifying the polynomial function that produces the lowest reconstruction error in the set. As described above, the block may comprise X columns by Y rows of of pixels. In certain implementations, as described above, the estimation of the reconstruction error for the block can be performed on a center pixel within the block.

At 406, the block identified at 402 can be reconstructioned based on the optimal polynomial order found at 404. In certain implementations, the optimal polynomial order can be directly applied to reconstruct the block. Sections B and C below provide further details regarding applying the optimal polynomial order directly to reconstruct the block.

At decision 408, it can be determined whether one or more blocks are left in the image that still need to be processed. As shown, when it is determined there are one or more blocks still needed to be processed, method 400 may proceed back to 402 to perform 402, 404, 406 and 408 again. As also shown, when it is determined there is no more block left to be processed, method 400 may proceed to 410.

At 410, a filtered image can be obtained using the blocks reconstructed at 406. In some implementations, standard rendering process can be employed to assemble the blocks reconstructed at 406, which may include stitching.

With the adaptive image filtering in accordance with the disclosure having been generally described, attention is now directed to section B and C below, where further details regarding optimizing polymial order locally based image signals in a block will be provided.

B. Decomposing the Reconstruction Error

Reconstruction error of a specific polynomial order K at a center pixel C can be defined as a L2 error based on the blocked-based reconstruction presented in equation 6:

$$\xi_c(k) \equiv \frac{1}{\sum_{i \in \Omega_c} K_h(i)} \sum_{i \in \Omega_c} K_h(i)(\hat{y}_k(i) - \mu(i))^2. \quad (7)$$

Given this definition of our reconstruction error, an optimal order $k_{opt}$ can be selected such that the reconstruction error $\xi_c(k_{opt})$ is minimal. Unfortunately, this optimization cannot be directly solved because it is based on the actual L2 error $(\hat{y}_k(i) - \mu(i))^2$ that uses the unknown image values $\mu(i)$. Hence, the actual reconstruction error term $\xi_c(k)$ may be estimated and thus the unknown optimal order $k_{opt}$. To estimate the optimal order $k_{opt}$ of the polynomial function $p(i)$, the crucial part involves estimating the actual error $(\hat{y}_k(i) - \mu(i))^2$ (in Eq. 7). To this end, the reconstruction error can be decomposed into a bias component and a variance component by taking the expectation operator E:

$$E(\hat{y}_k(i) - \mu(i))^2 = \text{bias}^2(\hat{y}_k(i)) + \sigma^2(\hat{y}_k(i)). \quad (8)$$

1. Bias Term

The bias term, $\text{bias}(\hat{y}_k(i))$, can be computed using the hat matrix in equation 5 as follows:

$$E(\hat{y}_k(i) - \mu(i)) = \sum_{j \in \Omega_c} H_{ij}(k)E(y(j)) - \mu(i) \approx \sum_{j \in \Omega_c} H_{ij}(k)\mu(j) - \mu(i), \quad (9)$$

where $H_{ij}(k)$ is the element at the i-th row and j-th column in the hat matrix $H(k)$. The second line is exact for unbiased MC ray tracing methods (e.g., path tracing), i.e., $E(y(j)) = \mu(j)$, but it is an approximated value for biased methods, such as photon mapping. Intuitively, the i-th row entries in the hat matrix can be thought of as reconstruction weights, allocated to neighboring pixels within the reconstruction window $\Omega_c$. As a result, the bias of the reconstruction can depend on the hat matrix $H(k)$ (in Eq. 5) and the matrix can thus vary as we change the polynomial order k.

2. Variance Term

The variance term of the reconstruction can be computed analogously:

$$\sigma^2(\hat{y}_k(i)) \approx \sum_{j \in \Omega_c} (H_{ij}(k))^2 \sigma^2(y(j)), \quad (10)$$

where the $\sigma^2(y(j))$ is the variance of the pixel intensity $y(j)$. The equation is exactly true only when each pixel intensity is independent from other pixels (e.g., path tracing) as the covariance terms between intensities can be ignore. As a result, the optimal polynomial order $k_{opt}$ can be computed using the bias and variance terms as follows:

$$k_{opt} = \arg\min_k \sum_{i \in \Omega_c} K_h(i)\left((E(\hat{y}_k(i) - \mu(i)))^2 + \sigma^2(\hat{y}_k(i))\right). \quad (11)$$

Note that the normalization term $(\sum_{i \in \Omega_c} K_h(i))^{-1}$ in Eq. 7 is dropped since that value is a constant. Also note the optimal order $k_{opt}$ is still an unknown term since the computation (Eq. 11) use the bias and variance terms with unknown quantities $\mu$ and $\sigma^2$ that can be obtained only using an infinite number of samples. Hence, the unknown terms in equation 11 may be estimated. Section IV will provide further details regarding such estimation.

IV. Multi-Stage Reconstruction Error Estimation

Given the bias and variance terms presented in equations 9 and 10, the straight-forward way to estimate the unknown intensities (i.e., $\mu(j)$ and $\mu(i)$) and variance $\sigma^2$ ($y(j)$) (in Eq. 9 and 10) is to use the input intensities (i.e., $y(j)$ and $y(i)$) and sample variance $s^2$ ($y(j)$), respectively. This approach can be an unbiased estimation, but it is typically too noisy and can lead to a noisy selection for polynomial order. To mitigate this problem, a multi-state error estimation can be used that iteratively estimates the unknown terms, $\mu(j)$ and $\mu(i)$. At a high level, the multi-state error estimation can iteratively estimate the bias and/or variance term for each polynomial order. For example, the bias term can be first estimated using an initial image value of the block in a first iteration. The estimation of the bias term can then be improved in one or more subsequent iterations, which take estimated bias term from the previous iteration as an input. The variance term can be iteratively estimated similarly.

Figure 5:
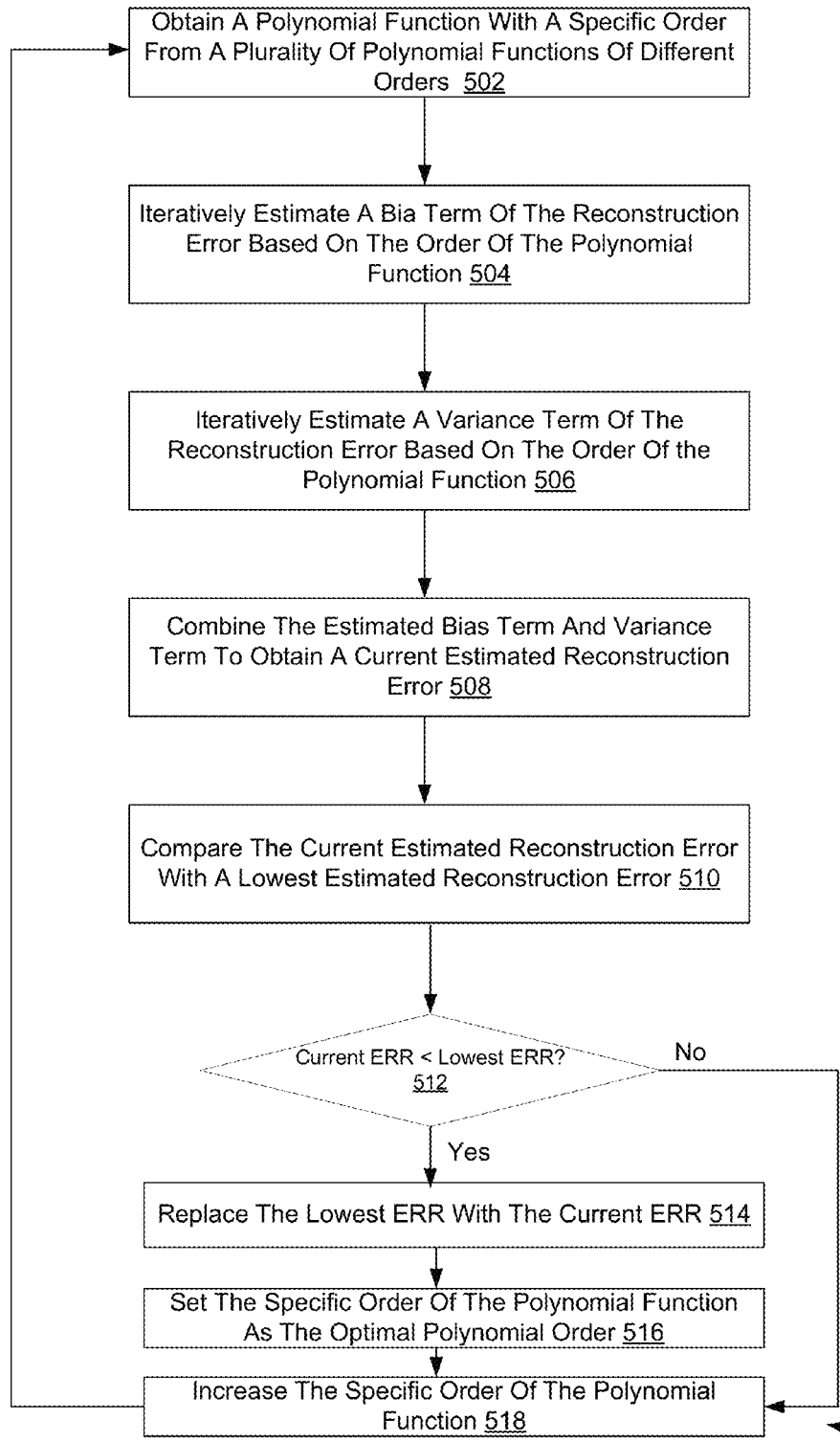
FIG. 5 illustrates an exemplary method perform a multi-state error estimation in accordance with the disclosure.

FIG. 5 illustrates an exemplary method for performing an iterative reconstruction error estimation in accordance with the disclosure. The method presented in FIG. 5 and described below is intended to be illustrative and non-limiting. The particular series of processing steps depicted in FIG. 5 is not intended to be limiting. It is appreciated that the processing steps may be performed in an order different from that depicted in FIG. 5 and that not all the steps depicted in FIG. 5 need be performed. In certain implementations, the method 500 may be implemented by a computer system, such as the computer system 100 shown in FIG. 1.

In some embodiments, the method depicted in method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At 502, a polynomial function with a specific polynomial order can be obtained from a plurality of polynomial functions of different orders. As illustration, the plurality of polynomial functions may include a constant, a linear, a square, a cubic and a quadric taylor polynomial functions described in equation 2. Operation at 502 may involve obtaining one of these functions sequentially, for example, starting at the constant function, and extracting the polynomial order of the obtained function, e.g., 0.

At 504, a bias term of the reconstruction error can be estimated iteratively based on the polynomial order of the polynomial function obtained at 504. The iterative estimation of the bias term may include estimating the bias term based on an initial image value of a center pixel within a block of the image. The iterative estimation of the bias term may include a first iteration where the bias term is estimated based on the initial image value, and one or more iterations subsequent to the first iteration, where the bias term is estimated based on the bias term estimated from the previous iteration. In some implementations, the iterative estimation of the bias term may include three to four iterations.

However, this not intended to be limiting. The number of iterations for estimating the bias term in accordance with the disclosure may be set as however desired. Further details regarding 504 are provided in FIG. 6 in accordance with some embodiments.

At 506, a variance term of the reconstruction error can be estimated iteratively based on the polynomial order of the polynomial function obtained at 504. The iterative estimation of the variance term may include estimating the variance term based on an initial image value of a center pixel within a block of the image. The iterative estimation of the variance term may include a first iteration where the variance term is estimated based on the initial image value, and one or more iterations subsequent to the first iteration, where the variance term is estimated based on a reconstructed image obtained based on the variance term estimated from the previous iteration. In some implementations, the iterative estimation of the variance term may include three to four iterations. However, this not intended to be limiting. The number of iterations for estimating the variance term in accordance with the disclosure may be set as however desired. Further details regarding 506 are provided in FIG. 7 in accordance with some embodiments.

At 508, the bias term and variance term estimated at 504, and 506 respectively can be combined to obtain a current estimated reconstruction error. In some exemplary implementations, operations 508 may include summing the bias term and variance term estimated at 504, and 506.

At 510, the reconstruction error estimated at 508 can be compared to a lowest estimated reconstruction error. In some implementations, the lowest reconstruction error can be set to infinity initially as the default lowest reconstruction error. At 512, at determination can be made whether the current estimated reconstruction error is smaller than the lowest estimated reconstruction error. As shown, when it is determined that current estimated reconstruction error is not smaller than the lowest estimated reconstruction error, method 500 proceed to 518. When when it is determined that current estimated reconstruction error is smaller than the lowest estimated reconstruction error, method 500 proceed to 514.

At 514, the lowest estimated reconstruction error can be replaced by the current estimated reconstruction error. At 516, the polynomial order of the polynomial function obtained at 502 can be set as the optimal polynomial order.

At 518, the polynomial order can be increased such that the next function in the plurality of polynomial functions can be obtained. As also shown, method 500 may proceed back to 502 after 510 to estimate the reconstruction error for the next polynomial order and determine if the next polynomial order is the optimal polynomial order for the block of the image.

A. Iteratively Estimating the Bias Term

In certain embodiments, for estimating the unknown term $\mu(j)$ and $\mu(i)$ for the bias term in equation 9, the following iterative equation may be used:

$$E_t(\hat{y}_k(i) - \mu(i)) \approx \sum_{j \in \Omega_c} H_{ij}(k)\hat{y}_{t-1}(j) - \hat{y}_{t-1}(i), \quad (12)$$

where t is an iteration number. In accordance with equation 12, for the first iteration, i.e., when t=1, $\hat{y}_0(j)$ and $\hat{y}_0(i)$ can be set as the Monte Carlo initial inputs y(j) and y(i). For the second iteration, the unknown intensities $\mu(j)$ and $\mu(i)$ (in Eq. 9) can be replaced with the reconstruction results $\hat{y}_1(j)$ and $\hat{y}_1(i)$, which are computed from the first iteration. For a third iteration and on (if more than two iterations are used), the bias term can be estimated using equation 9, such that the $\mu(j)$ and $\mu(i)$ in equation 9 are replaced with $\hat{y}_{t-1}(j)$ and $\hat{y}_{t-1}(i)$.

Figure 6:
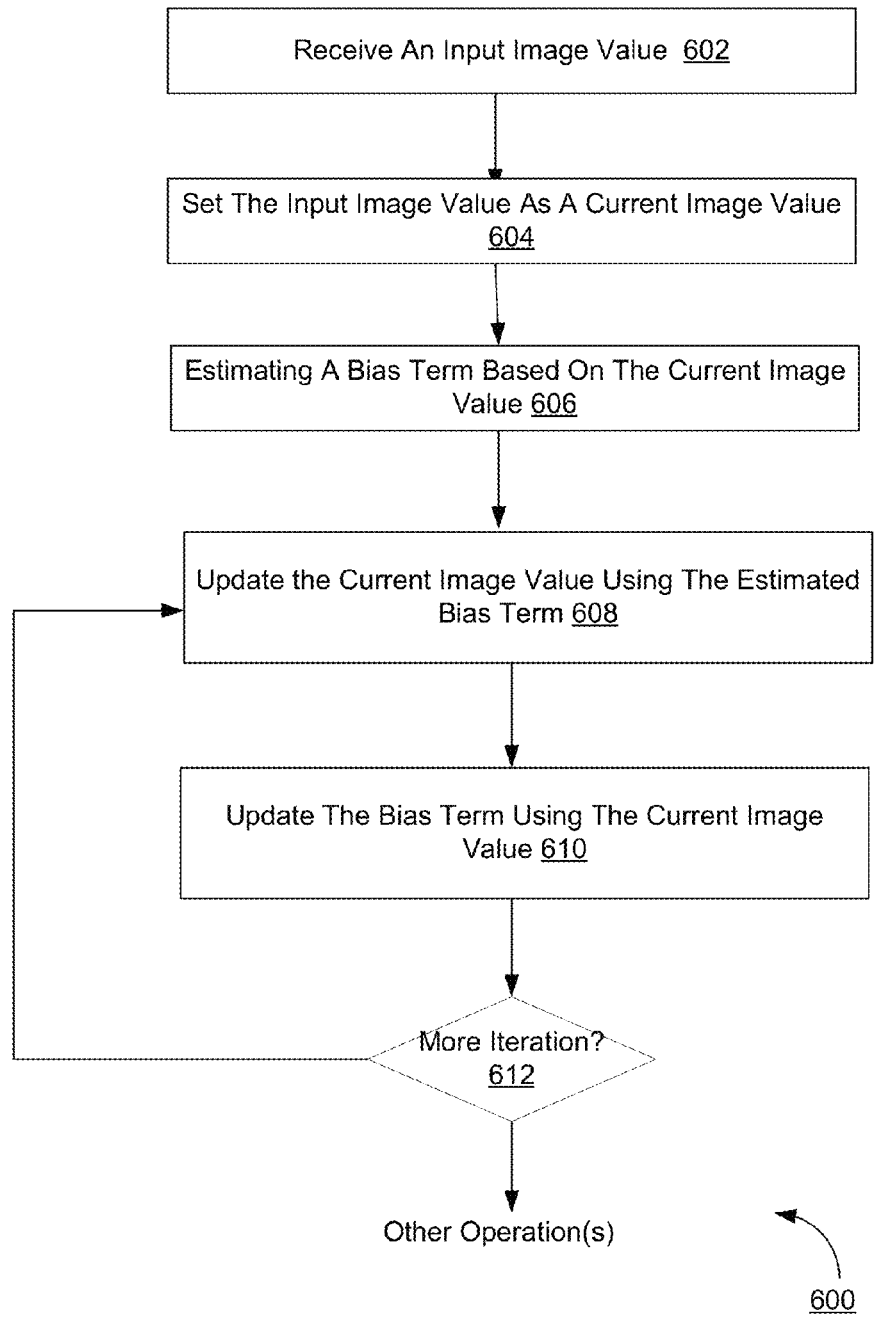
FIG. 6 illustrates one exemplary method for iteratively estimating a bias term for a polynomial order.

FIG. 6 illustrates one exemplary method for iteratively estimating a bias term for a polynomial order. The method presented in FIG. 6 and described below is intended to be illustrative and non-limiting. The particular series of processing steps depicted in FIG. 6 is not intended to be limiting. It is appreciated that the processing steps may be performed in an order different from that depicted in FIG. 6 and that not all the steps depicted in FIG. 6 need be performed. In certain implementations, the method 600 may be implemented by a computer system, such as the computer system 100 shown in FIG. 1.

In some embodiments, the method depicted in method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium.

The one or more processing devices may include one or more devices configured through hardware, firmware, and/or software to be specifically designed for execution of one or more of the operations of method 600.

At 602, one or more input image values 602 can be received. As described above, the input image value received at 602 can be a pixel value for a center pixel within the block. For example, as described above, the image value(s) received at 602 can include the Monte Carlo initial inputs y(j) and y(i).

At 604, the image value(s) received at 602 can be set a current image value. At 606, a bias term can be estimated based on the current image value and the current polynomial order. In some implementations, at operations 604 can involve implementing equation 12 presented above.

At 608, the current image value(s) can be updated using the bias term estimated at 604. In some implementations the operations at 608 may include implementation of equation 9 presented above. For example, the unknown intensities $\mu(j)$ and $\mu(i)$ (in Eq. 9) can be replaced with the reconstruction results $\hat{y}_1(i)$ and $\hat{y}_1(i)$.

At 610, the bias term can be updated using the current image value(s) updated at 608. In some implementations the operations at 610 may include implementation of equation 12 presented above.

At 612, a determination is made whether more iteration(s) are to be performed for estimating the bias term. As shown, when it is determined that more iteration(s) are to be performed, method 600 proceeds back to 608 to repeat 608, 610 and 612. As also shown, when it is determined that no more iteration is to be performed, method 600 process to other operations.

B. Iteratively Estimating the Variance Term

Similar to the bias term estimation, the variance term may also be estimated iteratively using as follows:

$$\sigma_t^2(\hat{y}_k(i)) \approx \sum_{j \in \Omega_c} (H_{ij}(k))^2 \sigma_{t-1}^2(y(j)), \quad (13)$$

where $\hat{\sigma}_{t-1}(y(j))$ is an estimated variance from the previous iteration. For the first iteration, the MC input variance $s^2(y(j))$ can be used. For the next iteration(s), the variance term can be estimated after the image is reconstructed from the first iteration, i.e., after the image is reconstructed using the bias and variance terms estimated in the first iteration. In one implementation, estimated standard deviations $\hat{\sigma}_t(y)$ are computed using the hat matrix $H(\hat{k}_{opt})$, i.e., $\hat{\sigma}_t(y)=H(\hat{k}_{opt})s(y)$, where the $\hat{k}_{opt}$ is the estimated optimal order for our reconstruction results.

This process is essentially an estimation process for unknown variances and it also requires an additional method that computes the optimal polynomial order for the variance term. It is a cascading problem the variances of $\sigma_t^2(y)$ needs to be estimated to decide the optimal order. For avoiding the recursive problem, the optimal order computed for reconstruction result can be used so that the hat matrix with the order can be reused. The standard deviation term $\sigma_t(y)$ locally can have a high correlation with the unknown intensity image μ since the variance is not an actual error but variation of the intensity for our rendering problem. For example, the correlation between the standard deviation term σ(y) and μ can be computed for a Kitchen scene (FIG. 8) given a filtering window $\Omega_c$. In one implementation, σ(y) and μ are computed using a reference image and its variance, generated by 8K samples per pixel. The correlation, 0.716, is a high number for the scene and thus our variance estimation can be a high-quality approximation even though it does not require additional processing.

Figure 7:
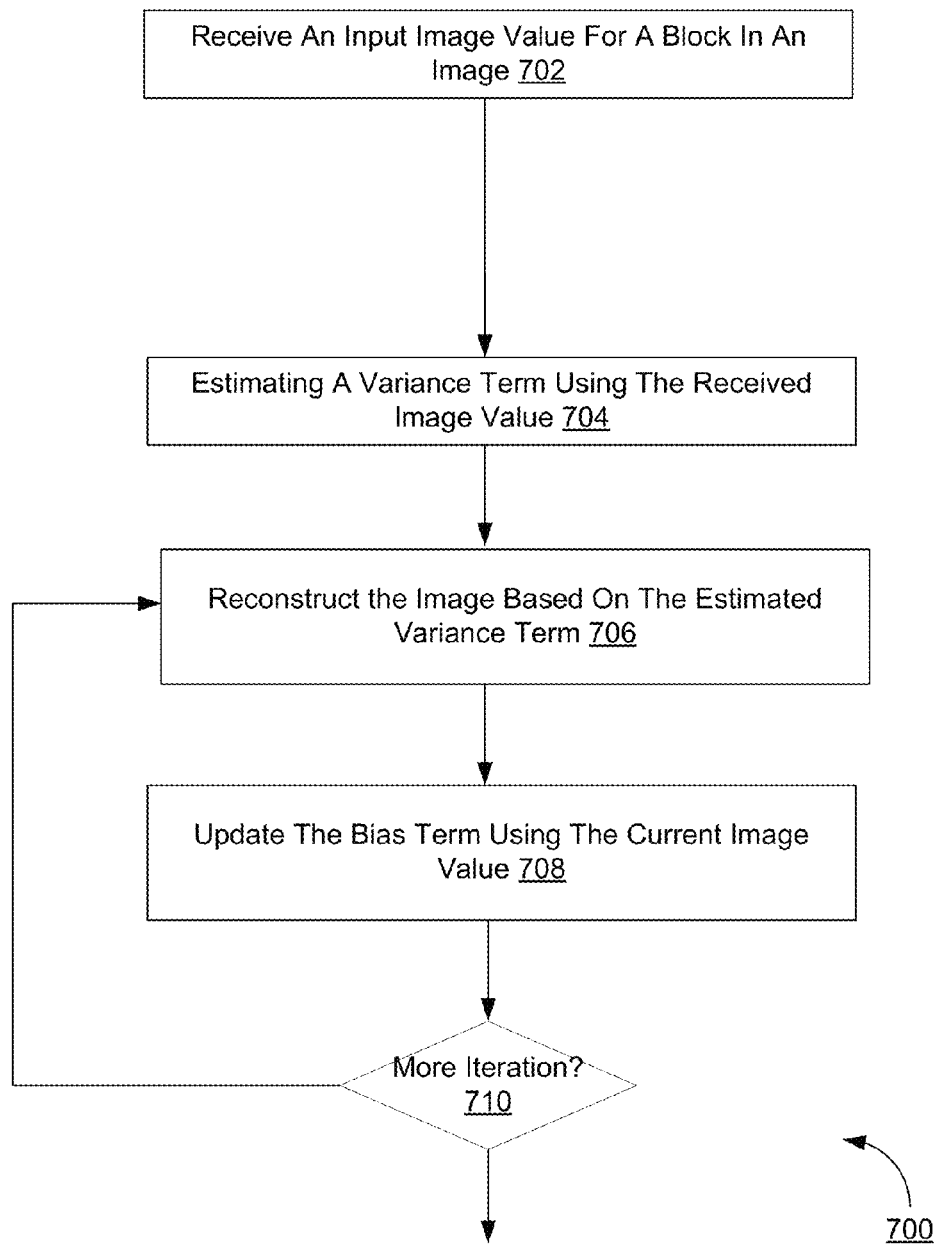
FIG. 7 illustrates one exemplary method for iteratively estimating a variance term for a polynomial order.

FIG. 7 illustrates one exemplary method for iteratively estimating a variance term for a polynomial order. The method presented in FIG. 7 and described below is intended to be illustrative and non-limiting. The particular series of processing steps depicted in FIG. 7 is not intended to be limiting. It is appreciated that the processing steps may be performed in an order different from that depicted in FIG. 7 and that not all the steps depicted in FIG. 7 need be performed. In certain implementations, the method 700 may be implemented by a computer system, such as the computer system 100 shown in FIG. 1.

In some embodiments, the method depicted in method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At 702, one or more input image values 702 can be received. As described above, the input image value received at 702 can be a pixel value for a center pixel within the block. For example, as described above, the image value(s) received at 702 can include a MC input variance $s^2(y(j))$.

At 704, a variance term can be estimated based on the image value(s) received at 702 and the current polynomial order. In some implementations, operations 704 can involve implementing equation 13 presented above.

At 706, a block of the image can be reconstructed using the variance term estimated at 704. In some implementations, operations 704 can involve implementing equation 11 presented above.

At 708, the variance term can be updated using the image constructed at 706. In some implementations the operations at 710 may include implementation of equation 13 presented above.

At 710, a determination is made whether more iteration(s) are to be performed for estimating the variance term. As shown, when it is determined that more iteration(s) are to be performed, method 700 proceeds back to 706 to repeat 706, 708 and 710. As also shown, when it is determined that no more iteration is to be performed, method 700 process to other operations.

C. Combining the Bias Term and Variance Term

The iterative estimation of bias and variance terms as described in equation 12 and 13 can be plugged into the equation 11 for selecting polynomial order, and thus the estimated optimal polynomial order can be updated. In implementations, a set of candidate polynomial orders from 0 to M can be applied as described in sections A and B. From the set of candidate polynomial orders, estimated optimal order $\hat{k}_{opt}$ can be selected such that that $\hat{k}_{opt}$ minimizes the reconstruction error. This process can be performed at each center pixel c, and produces an optimal polynomial at each pixel.

Figure 8:
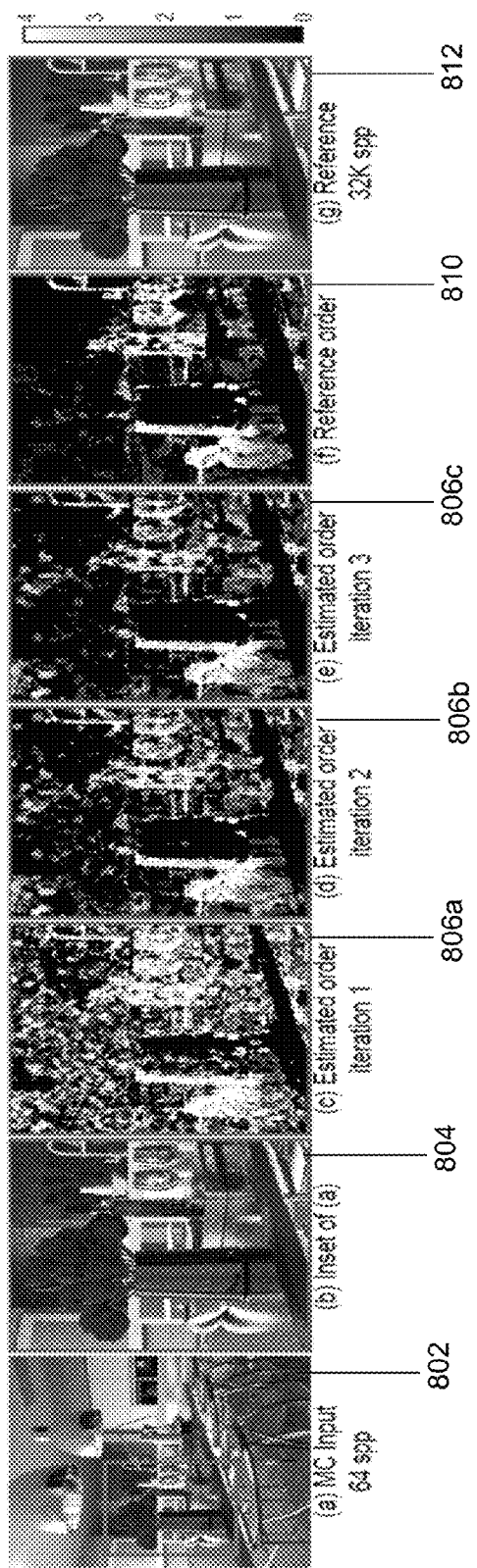
FIG. 8 illustrate an example of an image improved through the iterative estimation of bias and variance terms in accordance with the disclosure.

FIG. 8 illustrate an example of an image improved through the iterative estimation of bias and variance terms in accordance with the disclosure. As can be seen, for computing a reference order, the unknown error $\xi_c(k)$ (Eq. 7) can computed by plugging a reference image 812 generated by 32K samples per pixel, into the unknown image term μ(i). It should be understood that reference image is generated using an actual L2 error that cannot be computed in practice. As shown on FIG. 8, the result image 806a in the first iteration shows a noisy estimation for the optimal order since these are based on the input intensity and variance acquired through inset image 804 of a 3D scene 802 at 64 sample counts. As can be seen, in the second and third iteration images 806b and 806c, however, the estimation shows a pattern similar in comparison to the image 810 of the reference order. In addition, the third iteration is slightly less noisy than the second, but the respective patterns are visually similar. This observation is useful since an additional iteration may require a reconstruction process with non-negligible overhead. In some implementations, estimation with two iterations may thus be desired as it offers an attractive balance in terms of computational overhead and estimation quality for the tested scenarios.

V. Computer System

Figure 9:
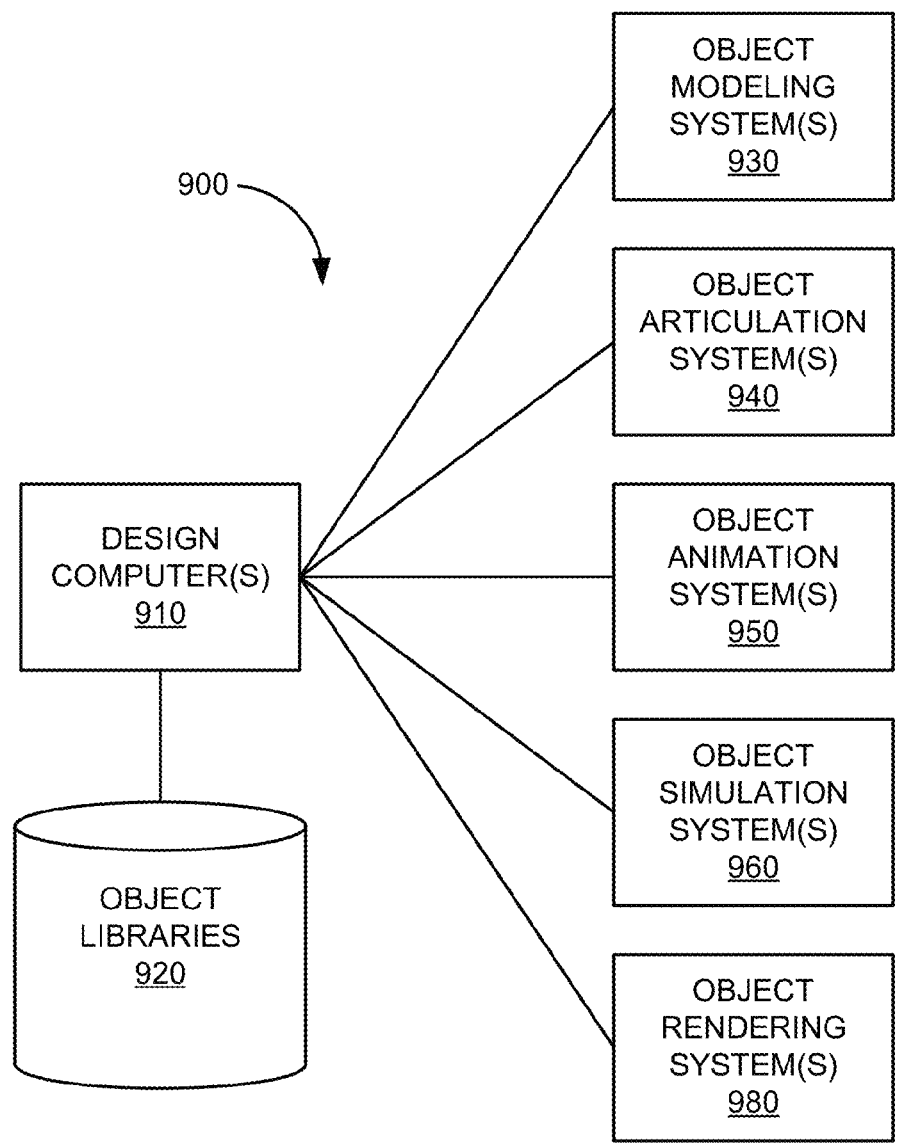
FIG. 9 is a simplified block diagram of system for creating computer graphics imagery (CGI) and computer-aided animation that may implement or incorporate various embodiments.

FIG. 9 is a simplified block diagram of system 900 for creating computer graphics imagery (CGI) and computer-aided animation that may implement or incorporate various embodiments. In this example, system 900 can include one or more design computers 910, object library 920, one or more object modeler systems 930, one or more object articulation systems 940, one or more object animation systems 950, one or more object simulation systems 960, and one or more object rendering systems 980. Any of the systems 930-980 may be invoked by or used directly by a user of the one or more design computers 910 and/or automatically invoked by or used by one or more processes associated with the one or more design computers 910. Any of the elements of system 900 can include hardware and/or software elements configured for specific functions.

The one or more design computers 910 can include hardware and software elements configured for designing CGI and assisting with computer-aided animation. Each of the one or more design computers 910 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 910 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 910 acting as a modeler may employ one or more systems or tools to design, create, or modify objects within a computer-generated scene. The modeler may use modeling software to sculpt and refine a 3D model to fit predefined aesthetic needs of one or more character designers. The modeler may design and maintain a modeling topology conducive to a storyboarded range of deformations. In another example, a user of the one or more design computers 910 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 910 acting as an animator may employ one or more systems or tools to specify motion and position of one or more objects over time to produce an animation.

Object library 920 can include elements configured for storing and accessing information related to objects used by the one or more design computers 910 during the various stages of a production process to produce CGI and animation. Some examples of object library 920 can include a file, a database, or other storage devices and mechanisms. Object library 920 may be locally accessible to the one or more design computers 910 or hosted by one or more external computer systems.

Some examples of information stored in object library 920 can include an object itself, metadata, object geometry, object topology, rigging, control data, animation data, animation cues, simulation data, texture data, lighting data, shader code, or the like. An object stored in object library 920 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 930 can include hardware and/or software elements configured for modeling one or more objects. Modeling can include the creating, sculpting, and editing of an object. In various embodiments, the one or more object modeling systems 930 may be configured to generated a model to include a description of the shape of an object. The one or more object modeling systems 930 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 930 may further generate model data (e.g., 2D and 3D model data) for use by other elements of system 900 or that can be stored in object library 920. The one or more object modeling systems 930 may be configured to allow a user to associate additional information, metadata, color, lighting, rigging, controls, or the like, with all or a portion of the generated model data.

The one or more object articulation systems 940 can include hardware and/or software elements configured to articulating one or more computer-generated objects. Articulation can include the building or creation of rigs, the rigging of an object, and the editing of rigging. In various embodiments, the one or more articulation systems 940 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 940 may further generate articulation data (e.g., data associated with controls or animations variables) for use by other elements of system 900 or that can be stored in object library 920. The one or more object articulation systems 940 may be configured to allow a user to associate additional information, metadata, color, lighting, rigging, controls, or the like, with all or a portion of the generated articulation data.

The one or more object animation systems 950 can include hardware and/or software elements configured for animating one or more computer-generated objects. Animation can include the specification of motion and position of an object over time. The one or more object animation systems 950 may be invoked by or used directly by a user of the one or more design computers 910 and/or automatically invoked by or used by one or more processes associated with the one or more design computers 910.

In various embodiments, the one or more animation systems 950 may be configured to enable users to manipulate controls or animation variables or utilized character rigging to specify one or more key frames of animation sequence. The one or more animation systems 950 generate intermediary frames based on the one or more key frames. In some embodiments, the one or more animation systems 950 may be configured to enable users to specify animation cues, paths, or the like according to one or more predefined sequences. The one or more animation systems 950 generate frames of the animation based on the animation cues or paths. In further embodiments, the one or more animation systems 950 may be configured to enable users to define animations using one or more animation languages, morphs, deformations, or the like.

The one or more object animations systems 950 may further generate animation data (e.g., inputs associated with controls or animations variables) for use by other elements of system 900 or that can be stored in object library 920. The one or more object animations systems 950 may be configured to allow a user to associate additional information, metadata, color, lighting, rigging, controls, or the like, with all or a portion of the generated animation data.

The one or more object simulation systems 960 can include hardware and/or software elements configured for simulating one or more computer-generated objects. Simulation can include determining motion and position of an object over time in response to one or more simulated forces or conditions. The one or more object simulation systems 960 may be invoked by or used directly by a user of the one or more design computers 910 and/or automatically invoked by or used by one or more processes associated with the one or more design computers 910.

In various embodiments, the one or more object simulation systems 960 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 960 may be used to simulate the behavior of objects, such as hair, fur, and cloth, in response to a physics model and/or animation of one or more characters and objects within a computer-generated scene.

The one or more object simulation systems 960 may further generate simulation data (e.g., motion and position of an object over time) for use by other elements of system 100 or that can be stored in object library 920. The generated simulation data may be combined with or used in addition to animation data generated by the one or more object animation systems 950. The one or more object simulation systems 960 may be configured to allow a user to associate additional information, metadata, color, lighting, rigging, controls, or the like, with all or a portion of the generated simulation data.

The one or more object rendering systems 980 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 980 may be invoked by or used directly by a user of the one or more design computers 910 and/or automatically invoked by or used by one or more processes associated with the one or more design computers 910. One example of a software program embodied as the one or more object rendering systems 980 can include PhotoRealistic RenderMan, or PRMan, produced by Pixar Animations Studios of Emeryville, Calif.

In various embodiments, the one or more object rendering systems 980 can be configured to render one or more objects to produce one or more computer-generated images or a set of images over time that provide an animation. The one or more object rendering systems 980 may generate digital images or raster graphics images.

In various embodiments, a rendered image can be understood in terms of a number of visible features. Some examples of visible features that may be considered by the one or more object rendering systems 980 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlight rays on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 980 may further render images (e.g., motion and position of an object over time) for use by other elements of system 900 or that can be stored in object library 920. The one or more object rendering systems 980 may be configured to allow a user to associate additional information or metadata with all or a portion of the rendered image.

Figure 10:
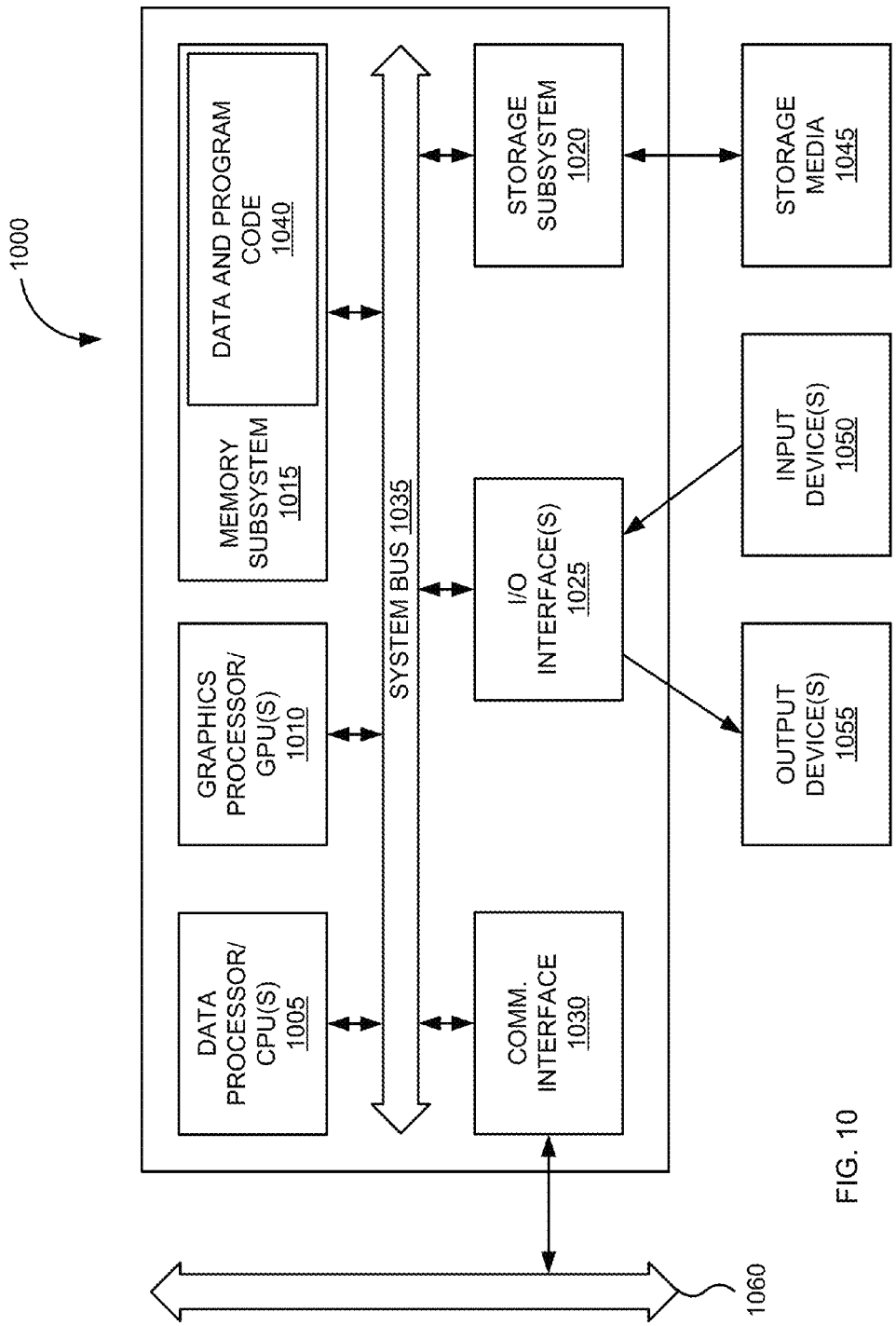
FIG. 10 is a block diagram of computer system that can be used to implement the adaptive image filtering in accordance with the disclosure.

FIG. 10 is a block diagram of computer system 1000. FIG. 10 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 1000 and any of its components or subsystems can include hardware and/or software elements configured for performing methods described herein.

Computer system 1000 may include familiar computer components, such as one or more one or more data processors or central processing units (CPUs) 1005, one or more graphics processors or graphical processing units (GPUs) 1010, memory subsystem 1015, storage subsystem 1020, one or more input/output (I/O) interfaces 1025, communications interface 1030, or the like. Computer system 1000 can include system bus 1035 interconnecting the above components and providing functionality, such connectivity and inter-device communication.

The one or more data processors or central processing units (CPUs) 1005 can execute logic or program code or for providing application-specific functionality. Some examples of CPU(s) 1005 can include one or more microprocessors (e.g., single core and multi-core) or micro-controllers, one or more field-gate programmable arrays (FPGAs), and application-specific integrated circuits (ASICs). As used herein, a processor includes a multi-core processor on a same integrated chip, or multiple processing units on a single circuit board or networked.

The one or more graphics processor or graphical processing units (GPUs) 1010 can execute logic or program code associated with graphics or for providing graphics-specific functionality. GPUs 1010 may include any conventional graphics processing unit, such as those provided by conventional video cards. In various embodiments, GPUs 1010 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1010 may include any number of registers, logic units, arithmetic units, caches, memory interfaces, or the like.

Memory subsystem 1015 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 1015 can include data and program code 1040.

Storage subsystem 1020 can also store information using machine-readable articles, information storage devices, or computer-readable storage media. Storage subsystem 1020 may store information using storage media 1045. Some examples of storage media 1045 used by storage subsystem 1020 can include floppy disks, hard disks, optical storage media such as CD-ROMS, DVDs and bar codes, removable storage devices, networked storage devices, or the like. In some embodiments, all or part of data and program code 1040 may be stored using storage subsystem 1020.

The one or more input/output (I/O) interfaces 1025 can perform I/O operations. One or more input devices 1050 and/or one or more output devices 1055 may be communicatively coupled to the one or more I/O interfaces 1025. The one or more input devices 1050 can receive information from one or more sources for computer system 1000. Some examples of the one or more input devices 1050 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1050 may allow a user of computer system 1000 to interact with one or more non-graphical or graphical user interfaces to enter a comment, select objects, icons, text, user interface widgets, or other user interface elements that appear on a monitor/display device via a command, a click of a button, or the like.

The one or more output devices 1055 can output information to one or more destinations for computer system 1000. Some examples of the one or more output devices 1055 can include a printer, a fax, a feedback device for a mouse or joystick, external storage systems, a monitor or other display device, a communications interface appropriately configured as a transceiver, or the like. The one or more output devices 1055 may allow a user of computer system 1000 to view objects, icons, text, user interface widgets, or other user interface elements. A display device or monitor may be used with computer system 1000 and can include hardware and/or software elements configured for displaying information.

Communications interface 1030 can perform communications operations, including sending and receiving data. Some examples of communications interface 1030 may include a network communications interface (e.g. Ethernet, Wi-Fi, etc.). For example, communications interface 1030 may be coupled to communications network/external bus 1060, such as a computer network, a USB hub, or the like. A computer system can include a plurality of the same components or subsystems, e.g., connected together by communications interface 1030 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 1000 may also include one or more applications (e.g., software components or functions) to be executed by a processor to execute, perform, or otherwise implement techniques disclosed herein. These applications may be embodied as data and program code 1040. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1015 and/or storage subsystem 1020.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method for rendering an image from a three-dimensional model, the method being performed by a computer system and comprising:
   receiving the image obtained by ray tracing with the three-dimensional model;
   identifying one or more blocks of the image;
   for each block of the one or more blocks:
      for each Taylor polynomial function of a plurality of Taylor polynomial functions of different orders:
         estimating a reconstruction error for reconstructing the block of the image using the Taylor polynomial function;
      identifying one of the plurality of Taylor polynomial functions with a lowest estimated error; and
      reconstructing the block through the image filter using the identified Taylor polynomial function to obtain a filtered image block; and
   using the one or more filtered blocks to obtain a filtered image.

2. The method of claim 1, wherein estimating the reconstruction error includes:
   estimating a bias term for the reconstruction error;
   estimating a variance term for the reconstruction error; and
   estimating the reconstruction error by combining the bias term and the variance term.

3. The method of claim 2, wherein estimating the bias term for the reconstruction error includes:
   estimating the bias term based on an input image value of the block.

4. The method of claim 3, wherein the bias term is estimated based on the input image value of the block through multiple iterations, wherein:
   the first iteration includes:
      estimating the bias term using the input image value of the block; and
      computing an updated image value of the block using the estimated bias term; and
   any iteration subsequent to the first iteration includes:
      estimating the bias term using the updated image value computed in the previous iteration; and
      computing the updated image value for a current iteration using the estimated bias term computed in the current iteration.

5. The method of claim 3, wherein computing the bias term based on the input image value includes:
   computing a projected value from the input image value.

6. The method of claim 1, wherein estimating the variance term for the reconstruction error includes:
   estimating the variance term based on an input image value of the block.

7. The method of claim 6, wherein the variance term is estimated based on the input image value of the block through multiple iterations, wherein:
   the first iteration includes:
      estimating the variance term using the input image value of the block; and
      computing an updated image value of the block using the estimated bias term; and
   any iteration subsequent to the first iteration includes:
      estimating the variance term using the updated image value computed in the previous iteration; and
      computing the updated image value for a current iteration based on the estimated variance term computed in the current iteration.

8. The method of claim 7, wherein computing the updated image value for the current iteration based on the estimated bias term computed in the current iteration includes:
   combining the estimated variance term and estimated bias term computed in the previous iteration to obtain the reconstruction error for the previous iteration.

9. A system for rendering an image from a three-dimensional model, the system comprising one or more of a processors configured by machine-readable instructions to perform:
   receiving the image obtained by ray tracing with the three-dimensional model;
   identifying one or more blocks of the image;
   for each block of the one or more blocks:
      for each Taylor polynomial function of a plurality of Taylor polynomial functions of different orders:
         estimating a reconstruction error for reconstructing the block of the image using the Taylor polynomial function;
      identifying one of the plurality of Taylor polynomial functions with a lowest estimated error; and
      reconstructing the block through the image filter using the identified Taylor polynomial function to obtain a filtered image block; and
   using the one or more filtered blocks to obtain a filtered image.

10. The system of claim 9, wherein estimating the reconstruction error includes:
    estimating a bias term for the reconstruction error;
    estimating a variance term for the reconstruction error; and
    estimating the reconstruction error by combining the bias term and the variance term.

11. The system of claim 10, wherein estimating the bias term for the reconstruction error includes:
    estimating the bias term based on an input image value of the block.

12. The system of claim 11, wherein the bias term is estimated based on the input image value of the block through multiple iterations, wherein:
    the first iteration includes:
       estimating the bias term using the input image value of the block; and
       computing an updated image value of the block using the estimated bias term; and any iteration subsequent to the first iteration includes:
  estimating the bias term using the updated image value computed in the previous iteration; and
  computing the updated image value for a current iteration using the estimated bias term computed in the current iteration.

13. The system of claim 11, wherein computing the bias term based on the input image value includes:
computing a projected value from the input image value.

14. The system of claim 9, wherein estimating the variance term for the reconstruction error includes:
estimating the variance term based on an input image value of the block.

15. The system of claim 14, wherein the variance term is estimated based on the input image value of the block through multiple iterations, wherein:
the first iteration includes:
  estimating the variance term using the input image value of the block; and
  computing an updated image value of the block using the estimated bias term; and
any iteration subsequent to the first iteration includes:
  estimating the variance term using the updated image value computed in the previous iteration; and
  computing the updated image value for a current iteration based on the estimated variance term computed in the current iteration.

16. The method of claim 15, wherein computing the updated image value for the current iteration based on the estimated bias term computed in the current iteration includes:
combining the estimated variance term and estimated bias term computed in the previous iteration to obtain the reconstruction error for the previous iteration.

17. A computer program product resident on a non-transitory tangible media that is executable on a computer system comprising a processor, a display, and a user-input device, the computer program product comprising:
program code for receiving the image obtained by ray tracing with the three-dimensional model;
program code for identifying one or more blocks of the image;
for each block of the one or more blocks:
  for each Taylor polynomial function of a plurality of Taylor polynomial functions of different orders:
    program code for estimating a reconstruction error for reconstructing the block of the image using the Taylor polynomial function;
  program code for identifying one of the plurality of Taylor polynomial functions with a lowest estimated error; and
  program code for reconstructing the block through the image filter using the identified Taylor polynomial function to obtain a filtered image block; and
program code for using the one or more filtered blocks to obtain a filtered image.

18. The computer program product of claim 17, wherein estimating the reconstruction error includes:
estimating a bias term for the reconstruction error;
estimating a variance term for the reconstruction error; and
estimating the reconstruction error by combining the bias term and the variance term.

19. The computer program product of claim 18, wherein estimating the bias term for the reconstruction error includes:
estimating the bias term based on an input image value of the block.

20. The computer program product of claim 19, wherein the bias term is estimated based on the input image value of the block through multiple iterations, wherein:
the first iteration includes:
  estimating the bias term using the input image value of the block; and
  computing an updated image value of the block using the estimated bias term; and
any iteration subsequent to the first iteration includes:
  estimating the bias term using the updated image value computed in the previous iteration; and
  computing the updated image value for a current iteration using the estimated bias term computed in the current iteration.

* * * * *